(12) United States Patent
Napper

(10) Patent No.: US 8,009,914 B2
(45) Date of Patent: *Aug. 30, 2011

(54) HANDWRITTEN CHARACTER RECOGNITION

(75) Inventor: Jonathon Leigh Napper, Balmain (AU)

(73) Assignee: Silverbrook Research Pty Ltd, Balmain, New South Wales (AU)

(*) Notice: Subject to any disclaimer, the term of this patent is extended or adjusted under 35 U.S.C. 154(b) by 0 days.

This patent is subject to a terminal disclaimer.

(21) Appl. No.: 12/941,807

(22) Filed: Nov. 8, 2010

(65) Prior Publication Data

US 2011/0052066 A1 Mar. 3, 2011

Related U.S. Application Data

(63) Continuation of application No. 12/750,587, filed on Mar. 30, 2010, now Pat. No. 7,848,574, which is a continuation of application No. 12/031,615, filed on Feb. 14, 2008, now Pat. No. 7,697,761, which is a continuation of application No. 10/492,168, filed as application No. PCT/AU02/01393 on Oct. 15, 2002, now Pat. No. 7,359,551.

(30) Foreign Application Priority Data

Oct. 15, 2001 (AU) ........................... PR8245

(51) Int. Cl.
 *G06K 9/18* (2006.01)
 *G06K 9/62* (2006.01)
 *G06K 9/34* (2006.01)
 *G06K 9/00* (2006.01)

(52) U.S. Cl. ........ 382/186; 382/159; 382/179; 382/185; 382/187

(58) Field of Classification Search .................. 382/159, 382/164, 171, 173, 177, 179, 181, 185–187, 382/216, 226–228, 259, 300, 202–203, 209, 382/213, 224

See application file for complete search history.

(56) References Cited

U.S. PATENT DOCUMENTS 3,755,780 A * 8/1973 Sammon et al. .............. 382/194
(Continued)

FOREIGN PATENT DOCUMENTS

EP 0953933 A 11/1999
(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

(Continued)

*Primary Examiner* — Samir A Ahmed
*Assistant Examiner* — Mehdi Rashidian

(57) ABSTRACT

A method for classifying a handwritten input character is disclosed. Character models are used. Each character model is associated with an output character and defines a model specific segmentation scheme for that output character and an associated segment model. The model specific segmentation scheme defines a minimum length corresponding to a number of points in a stroke of the output character and a minimum length threshold. Using each of the character models, the input character is decomposed into segments and the segments are evaluated against the segment model of the respective character model to produce a score indicative of the conformity of the segments with the segment model. The character model that produced the highest score is selected and the input character is classified as the output character associated with the character model that produces the highest score.

7 Claims, 3 Drawing Sheets

U.S. PATENT DOCUMENTS

| | | | |
|---|---|---|---|
| 4,245,245 A | 1/1981 | Matsumoto et al. | |
| 4,345,245 A | 8/1982 | Vella et al. | |
| 4,731,857 A | 3/1988 | Tappert | |
| 4,837,842 A * | 6/1989 | Holt | 382/204 |
| 4,864,618 A | 9/1989 | Wright et al. | |
| 5,051,736 A | 9/1991 | Bennett et al. | |
| 5,477,012 A | 12/1995 | Sekendur | |
| 5,491,758 A | 2/1996 | Bellegarda et al. | |
| 5,557,689 A * | 9/1996 | Huttenlocher et al. | 382/177 |
| 5,652,412 A | 7/1997 | Lazzouni et al. | |
| 5,661,506 A | 8/1997 | Lazzouni et al. | |
| 5,692,073 A | 11/1997 | Cass | |
| 5,706,364 A * | 1/1998 | Kopec et al. | 382/159 |
| 5,745,599 A | 4/1998 | Uchiyama et al. | |
| 5,818,963 A | 10/1998 | Murdock et al. | |
| 5,841,902 A | 11/1998 | Tu | |
| 5,852,434 A | 12/1998 | Sekendur | |
| 6,076,734 A | 6/2000 | Dougherty et al. | |
| 6,092,065 A * | 7/2000 | Floratos et al. | 707/737 |
| 6,125,208 A | 9/2000 | Maier et al. | |
| 6,249,605 B1 * | 6/2001 | Mao et al. | 382/186 |
| 6,256,410 B1 | 7/2001 | Nathan et al. | |
| 6,327,386 B1 * | 12/2001 | Mao et al. | 382/186 |
| 6,678,415 B1 * | 1/2004 | Popat et al. | 382/226 |
| 6,964,374 B1 | 11/2005 | Djuknic et al. | |
| 7,136,526 B2 * | 11/2006 | Hotta et al. | 382/187 |
| 7,136,530 B2 * | 11/2006 | Lee et al. | 382/229 |
| 7,336,827 B2 * | 2/2008 | Geiger et al. | 382/186 |
| 7,359,551 B2 | 4/2008 | Napper | |
| 2003/0108239 A1 | 6/2003 | Su et al. | |
| 2005/0169531 A1 | 8/2005 | Fan | |
| 2005/0175241 A1 | 8/2005 | Napper | |
| 2006/0050962 A1 * | 3/2006 | Geiger et al. | 382/186 |

FOREIGN PATENT DOCUMENTS

| | | |
|---|---|---|
| GB | 2306669 A | 5/1997 |
| JP | 07-182509 | 7/1995 |
| JP | 08-249424 | 9/1996 |
| JP | 09-035001 | 2/1997 |
| WO | WO 99/18487 A2 | 4/1999 |
| WO | WO 99/50787 | 10/1999 |

OTHER PUBLICATIONS

Hennig A et al: "Recognising letters in on-line handwriting using hierarchical fuzzy inference" Proceedings of the 4th International Conference on document analysis and recognition. IEEE Comp. Soc, US, vol. II, Aug. 18, 1997 pp. 936-940, ZP010244868 ISBN: 0-8186-7898-4.

IBM "Handwriting Recognition by Substroke Segmentation and Composition" IBM Technical Disclosure Bulletin, vol. 27, No. 9, Feb. 1, 1965 pp. 5167-5170, XP002374957 New York, US.

Parizeau M et al., "A fuzzy-syntactic approach to allograph modeling for cursive script recognition" IEEE Transactions on pattern analysis and machine intelligence USA, vol. 17, No. 7, Jul. 1995 pp. 702-712, XP000514690 ISSN: 0162-8828.

Prevost L et al. "Model generation and cooperation in on-line omniwriter handwriting recognition" Information Fusion, 2000. Proceedings of the Third International Conference on Jul. 10-13, 2000, Piscataway, NJ, USA, IEEE vol. 2, Jul. 10, 2000, pp. 3-8, XP010505137 ISBN. 2-7257-0000-0.

Vuurpijl et al. "Finding structure in diversity: A hierarchial clustering method for the categorization of allographs in handwriting" Fourth International Conference on Document Analysis and Recognition Aug. 18-20, 1997 (Whole document).

\* cited by examiner

*FIG. 4A)*    *FIG. 4B)*
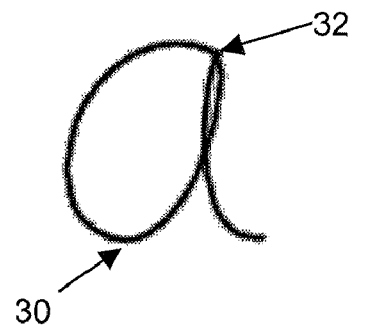
*FIG. 5*
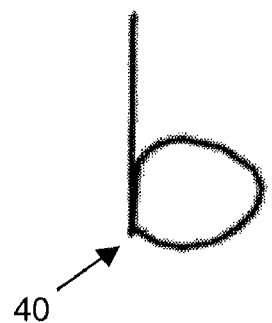
*FIG. 6*
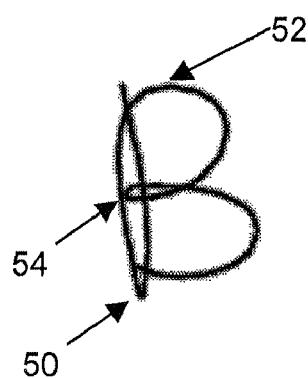
*FIG. 7*

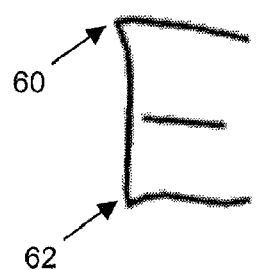
FIG. 8  A)  B)  C)
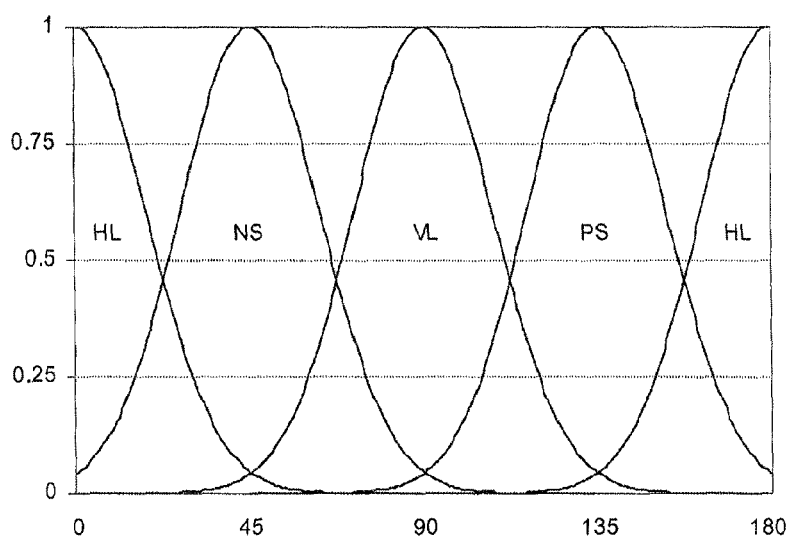
FIG. 9
FIG. 10
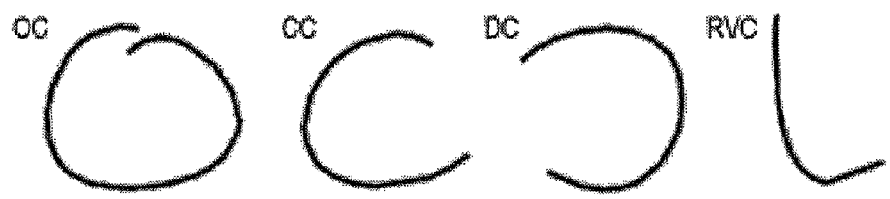
FIG. 11  A)  B)  C)  D)

HANDWRITTEN CHARACTER RECOGNITION

CROSS REFERENCE TO RELATED APPLICATION

This application is a continuation application of U.S. application Ser. No. 12/750,587 filed Mar. 30, 2010, which is a continuation application of U.S. application Ser. No. 12/031,615 filed Feb. 14, 2008, now issued U.S. Pat. No. 7,697,761, which is a continuation application of U.S. application Ser. No. 10/492,168 filed Apr. 9, 2004, now issued U.S. Pat. No. 7,359,551, which is a 371 of PCT/AU02/01393 filed Oct. 15, 2002 all of which are herein incorporated by reference.

TECHNICAL FIELD

The present invention relates to a method of interpreting and decoding handwritten data entry into a computer or other processing device, and in particular, to a method of handwriting recognition which involves decomposing individual characters into one or more primitive sub-strokes, where applicable.

BACKGROUND ART

The reference to any prior art in this specification is not, and should not be taken as, an acknowledgement or any form of suggestion that the prior art forms part of the common general knowledge.

Prior art processing devices, such as handheld computers, are available which decode user instructions based on handwritten data inputs. Other devices force the user to enter data using a pseudo-handwritten format. One example of such a device is produced by Palm Computers and use a proprietary input format known as Graffiti. This input format allows the user of a handheld computer to enter data into the device by moving a plastic stylus in predefined motions over a touchscreen area, where each character has an associated 'stroke', which in many cases resembles the actual character.

Such systems offer advantages where the portable device is too small to have a usefully sized keyboard, but they require the user to learn an artificial 'language' in order to enter data.

The range of handwriting styles possessed by individual users is vast, and therefore, the provision of automated computer recognition of different user's handwriting is problematic. This has resulted in minimal use of commercially viable handwriting recognition systems in computing devices. It is desirable to provide a system which is able to interpret handwriting without forcing the user to adapt his or her writing style to conform with the expected input style of a particular device.

Most pattern or character recognition systems perform some kind of segmentation of an input signal to identify the fundamental primitives of the data and to minimize the level of noise in the input. Segmentation is also performed to reduce the amount of information used during feature extraction, and allows pattern recognition to occur on more abstract features of the input signal.

In handwriting recognition systems, individual strokes are often segmented into a number of sub-stroke primitives during preprocessing. These primitives are then passed to a feature extraction module or used directly for pattern classification. In cursive or connected print recognition systems, a single stroke may represent more than one letter, so segmentation is used to identify potential letter segmentation points.

Many segmentation techniques have been described by the research community, including simple approaches based on the properties of the human motor system Examples include segmenting at curvature maxima, critical points, and velocity extrema, or a combination of these techniques (e.g. looking for points where curvature extrema and velocity minima coincide). Other research has proposed using ballistic gesture detection, independent component analysis of the strokes, and regularity and singularity concepts for the segmentation of strokes.

While the above procedures use handwriting generation as the foundation for segmentation, other techniques are based on the perception process. Key to the visual decoding of letters is the perception of the local relative positions of primitives thus positional extrema play an important role in the recognition of letter shapes. Perception based criteria for segmentation include X and Y extrema, cusps, and stroke intersections.

While stroke segmentation can improve the accuracy of a handwriting recognition system under certain conditions, it can also be a major source of recognition errors. Most motor-based stroke segmentation algorithms apply some kind of numeric threshold when selecting segmentation points, resulting in the possibly inconsistent splitting of strokes that are poorly formed. FIG. 2b) shows the incorrect segmentation based on curvature extrema of a badly written letter 'a'.

In this example, stroke segmentation is being used to partition or segment the circular body of the 'a' from the more linear stem using the extreme curvature at the top of the stem as a segmentation point. FIG. 2a) shows the correct segmentation point (as indicated by the cross). However, FIG. 2b) has a curvature extremum inside the circular body, and is missing the expected cusp that marks the beginning of the letter stem, resulting in the incorrect segmentation of the stroke.

Velocity is also used for segmentation, since handwriting is generated by a series of ballistic movements (i.e. accelerating from the start to a peak velocity, then decelerating at the target point). Sections of high velocity are generally straight, while low velocity usually occurs at the extrema of curvature. However, velocity is also subject to thresholding problems, and additionally, the user may pause while writing a stroke, leading to an invalid segmentation point. In FIG. 3, the sampled points, indicated by squares, for a letter 'a' are shown. The velocity of the pen can be derived from the spacing between the samples (assuming a constant sampling rate), so a large spacing indicates high velocity, while samples that are close together indicate lower velocity. In the example, the low velocity (and high curvature) regions can be seen as clusters of samples in the cusp at the top of the stem, as well as in the small hook at the bottom of the stem. However, there is another region of low velocity (on the left of the circular region) that was caused by the writer hesitating during the down-stroke. So while the letter 'a' is clearly well written, the velocity-based segmentation may produce an inconsistent result.

Perceptual segmentation techniques, such as using Y-extrema as segmentation points, generally do not suffer from thresholding problems, since no numeric value is required to determine if a point is a local extremum. However, these techniques also suffer from inconsistent segmentation. In FIG. 4a), the letter 'a' is segmented, indicated by a cross, at a Y-extremum located near the start of the stroke. However, the second letter 'a', shown in FIG. 4b) while clearly the same letter as the first, does not contain a Y-extremum at this position, as the stroke tends to level off.

Most other segmentation algorithms suffer from these problems, and are particularly affected by poorly written letters. Due to the difficult and error-prone nature of stroke segmentation, many systems do not attempt any kind of stroke segmentation and simply work directly on the raw, un-segmented strokes provided by the user. Those systems that do perform stroke segmentation usually implement some kind of elastic matching procedure to minimize the effect of inconsistent segmentation.

"Elastic Structural Matching For Recognizing Online Handwritten Alphanumeric Characters," *Technical Report HKUST-CS98-07*, Department Of Computer Science, Hong Kong University, March 1998 discloses the use of extrema of curvature to segment strokes into multiple line segments. However, they note that "a smooth stroke may be broken into parts due to poor quality writing" thus causing incorrect segmentation to occur. To counter this, they implement a set of rules that attempt to detect invalid segmentation, combining incorrectly segmented sub-strokes to form a new stroke.

"Handwritten Word Recognition—The Approach Proved By Practice", *Advances In Handwriting Recognition*, Series in Machine Perception and Artificial Intelligence, Vol. 34, pp. 153-162, World Scientific Publishing Co. 1999 discloses the use of zero crossing points in vertical velocity to segment handwritten cursive strokes in a commercial optical check-reading system. The sub-strokes are then matched against a set of primitive elements to be used in an elastic-matching recognizer.

"Global Methods for Stroke-segmentation", *Advances In Handwriting Recognition*, Series in Machine Perception and Artificial Intelligence, Vol. 34, pp. 225-234, World Scientific Publishing Co. 1999 discloses stroke segmentation of offline images based on contour curve fitting. In their method, curves are first approximated using cubic B-splines, with segmentation cuts made at the extreme points of curvature.

"A Fuzzy Online Handwriting Recognition System: FOHRES," *Proceedings of the 2$^{nd}$ International Conference on Fuzzy Theory and Technology*, 13-16 Oct., 1993, Durham, N.C. teaches the use of fuzzy-logic representations of pen velocity and direction together with a group of linguistic variables to form a set of fuzzy-logic rules for stroke segmentation. Their segmented strokes are used as the primitives for fuzzy feature extraction.

"Recognizing Letters in Online Handwriting Using Hierarchical Fuzzy Inference", *4$^{th}$ International Conference Document Analysis and Recognition (ICDAR)*, Aug. 18-20, 1997, Ulm, Germany discloses the segmentation of strokes at cusps and points with horizontal tangents into sets of PStrokes (partial strokes). The disclosed algorithm uses a system of angular smoothing (rather than the point-position smoothing that is often performed) that does not distort discontinuous parts of the pen trajectory (i.e. cusps).

"Detection Of Extreme Points of Online Handwritten Scripts", *Progress In Handwriting Recognition*, pp. 169-176, 2-5 Sep., 1996, Colchester, UK. World Scientific Publishing Co. discloses a robust local extrema of curvature detection algorithm that is based on the delta log-normal theory of handwriting recognition, which is disclosed in "A Delta Log-normal Model for Handwriting Generation," *Proceedings of the 7$^{th}$ Biennial Conference of the International Graphonomics Society*, 126-127, 1995. To segment strokes into primitive components, they disclose the use of calculations of angular signal intensity and first order crossing points.

"Perceptual Model of Handwriting Drawing Application to the Handwriting Segmentation Problem", *4$^{th}$ International Conference Document Analysis and Recognition (ICDAR)*, Aug. 18-20, 1997, Ulm, Germany discloses a modeling and segmentation approach based on the detection of a set of "perceptual anchor points". Basically, they search for 'catastrophe' points, which are defined as points of discontinuity such as pen-ups, sharp turns, and cusps, and 'perceptual' points, which include points of inflection, X- and Y-extrema, and stroke intersection points.

U.S. Pat. No. 6,275,611 describes a character recognition system that segments strokes at points where "local angle change is a maxima and exceeds a set threshold". See also "Handwriting Recognition Device, Method and Alphabet, With Strokes Grouped Into Stroke Sub-Structures", Aug. 14, 2001. A full description of the segmentation algorithm is given in U.S. Pat. No. 5,740,273. Similarly, U.S. Pat. No. 5,889,889 discloses the performance of stroke segmentation in a handwritten character recognizer by detecting points that "are identified by such criteria as abruptness of direction changes, as well as by pen lifts". This discloses the same segmentation procedure in a system designed to represent handwritten input in a parametric form for compression and reconstruction, segmenting strokes at "corners and cusps, where direction changes abruptly". See also U.S. Pat. No. 6,044,174.

The process described in U.S. Pat. No. 6,137,908 identifies Y-extrema as part of the preprocessing of strokes for recognition. Intermediate points between these extremum are also extracted and stored as a "frame" for use in the recognition system.

Similarly, U.S. Pat. No. 5,610,996 discloses the use of a series of arcs as primitives for recognition, where "the arcs begin and end at Y-extrema points on the sample text." This document also discloses the use of alternative segmentation schemes, such as X-extrema, and combined X-Y extrema.

U.S. Pat. No. 4,024,500 discloses the use of X- and Y-extrema to segment cursive strokes in to characters (rather than ballistic sub-stroke primitives).

U.S. Pat. No. 5,854,855 teaches the use of a velocity profile to segment strokes, and "associates sub-stroke boundaries with selected velocity minima in the handwriting input."

U.S. Pat. No. 5,577,135 discloses the segmentation of strokes at Y-extrema, resulting in a series of up- and down-strokes that are used in a Hidden Markov Model (HMM) recognition system. In another HMM recognition system described in U.S. Pat. No. 5,878,164, strokes are "segmented into letters or sub-character primitives according to defined boundary conditions such as pen ups and cusps".

The prior art references each attempt to introduce new techniques to address the problems of recognizing handwritten input text. Each may offer an improvement, but none offers a robust system which addresses all the previously described problems.

DISCLOSURE OF INVENTION

In accordance with an aspect of the present invention there is provided a method for classifying a handwritten input character, the method comprising the steps of:
(a) receiving the handwritten input character from an input device;
(a) for each of a plurality of character models, each character model being associated with an output character and defining a model specific segmentation scheme for that output character and an associated segment model, the model specific segmentation scheme defining a minimum length corresponding to a number of points in a stroke of the output character:
  (i) decomposing the handwritten input character into one or more segments in accordance with the model specific segmentation scheme of the respective character model; and (ii) evaluating the one or more segments against the segment model of the respective character model to produce a score indicative of the conformity of the one or more segments with the segment model;

(b) selecting the character model that produced the highest score; and, (c) classifying the handwritten input character as the output character associated with the character model that produces the highest score.

Other aspects are also disclosed.

BRIEF DESCRIPTION OF FIGURES

The present invention should become apparent from the following description, which is given by way of example only, of a preferred but non-limiting embodiment thereof, described in connection with the accompanying figures, wherein:

FIGS. 4a) and 4b) illustrate the problem of using y-extrema to decode the letter 'a';

FIG. 5 shows the segmentation of the letter 'a';

FIG. 6 shows the segmentation of the letter 'b';

FIG. 7 shows the segmentation of the letter 'B';

FIGS. 8a), 8b) and 8c) show the three individual segments of the letter 'B';

FIG. 9 shows the segmentation of the letter 'E';

FIG. 10 shows the fuzzy group memberships based on line orientation in degrees; and FIGS. 11a)-d) show a selection of generic stroke primitives used in character recognition.

MODES FOR CARRYING OUT THE INVENTION

Figure 1:
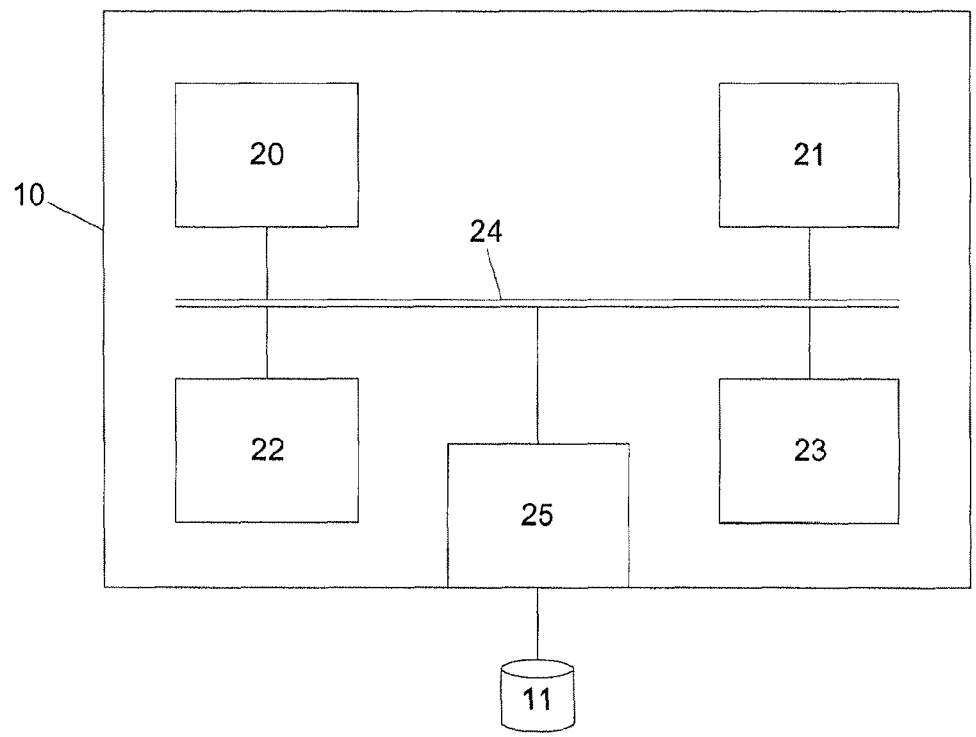
FIG. 1 illustrates an embodiment of the present invention wherein, the figure shows a processing system arranged to receive user inputs and process them according to further embodiments of the invention.

The following modes are described as applied to the written description and appended claims in order to provide a more precise understanding of the subject matter of the present invention.

The following examples provide a more detailed outline of one embodiment of the present invention. These examples are intended to be merely illustrative and not limiting of the scope of the present invention.

The present invention provides a method for performing handwritten character recognition. Also provided is an apparatus for performing the method. In the figures, incorporated to illustrate the features of the present invention, like reference numerals are used to identify like parts throughout the figures.

Methods according to embodiments of the invention can be performed using a processing system an example of which is shown in FIG. 1.

In particular, the processing system 10 generally includes at least a processor 20, a memory 21, and an input device 22, such as a graphics tablet and/or touchscreen, an output device 23, such as a display, coupled together via a bus 24 as shown. An external interface is also provided as shown at 25, for coupling the processing system to a store 11, such as a database. Additionally, a stylus may be used to allow a user to input text to the system 10.

In use, the processing system is adapted to allow model and rule data to be stored in and/or retrieved from the database 11. This allows the processor to receive handwriting data via the input 22, process the handwriting data and compare this to the data stored in the store. This in turn allows the processing system to recognize the characters included in the handwritten text. From this, it will be appreciated that the processing system 10 may be any form of processing system such as a computer, a laptop, server, specialized hardware, or the like.

The operation of the processing system 10 will now be described in more detail.

Herein is described a model-specific approach to stroke segmentation for handwritten character recognition, including examples of model-specific algorithms. Techniques for the optimization of the procedure are also given.

It is clear that the stroke segmentation heuristics described above in relation to prior art techniques do not always produce consistent segmentation points due to the extreme variability in handwritten input. The problem is caused, in part, by the segmentation procedure operating independently of the letter recognition. This means that degenerative situations will produce incorrect results, and these segmentation failures will be hard to detect and correct in the classifier which attempts to correlate the segments with a single character.

Due to the ambiguity of handwriting, a graphic symbol may have a different meanings depending on local context; for example, ambiguous letter formations may be interpreted differently based on syntactic or semantic information (such as a dictionary or character grammar). Similarly, the individual strokes and sub-strokes that comprise an individual letter need to be interpreted in terms of the local context to ensure the correct interpretation is made.

Embodiments of the invention which use model-specific stroke segmentation, delay the segmentation of handwritten strokes, allowing it to be integrated with the classification procedure. This results in more information about the type of segmentation points expected by the letter model to be used by the segmentation process. The metric used to segment the strokes is based on the expected structure of the current character from a series that is being recognized, thus a single global segmentation procedure is not used.

As each letter prototype, allograph or character model is compared to the input, the input strokes are segmented based on whatever technique will identify the critical points, resulting in a more consistent decomposition of the strokes into primitives. Additionally, the failure of the segmentation process to find the expected segmentation points for a particular letter model means that further analysis of that model is not required, allowing efficient culling of models that do not match the general structure of the input.

In practice, the user enters a character using a stylus, and the processor, executing a program to perform an embodiment of the invention, first checks whether the input letter is an 'a', and will attempt to segment the input according to what is expected for an 'a'. It then continues to check the input against some or all possible data entries, for example, 'b'-'z', scoring each attempt. In this way, the result having the closest match is classified as the input letter. A suitable scoring scheme is disclosed later.

There may be several models for each letter to take account of the various ways in which a particular letter may be written. For instance, some people write the letter 'z' to look like an upper case 'N' on its side, while others write it to so that it resembles the number '3'.

It is noted that while each letter model potentially requires a segmentation procedure to be performed, many models will use the same or similar segmentation points, meaning that these points can be cached to reduce the segmentation processing overhead. For instance, the letters 'y' and 'g' have similar depending tail segments which may be cached as described.

Recognition begins with some simple preprocessing to remove noise from the signal. This may include techniques such as smoothing of the sampled points (if the sampling process is noisy) and removing hooks from the beginning and end of the strokes, which would otherwise confuse the recognition process. The points may also be normalized by removing duplicate points or re-sampling to enforce a minimum distance between samples.

Each letter model defined in the handwriting classifier defines a segmentation procedure that will be performed on the input strokes. The segmentation produces a set of segmentation points that will be used to partition the stroke into a series of sub-strokes. The algorithm works on a single stroke at a time. To avoid creating stroke sub-segments that are too small to be structurally relevant, a minimum sub-stroke length is calculated based on the overall length of the stroke:

$$l_{min} = \lambda \sum_{i=2}^{n} \|p_i - p_{i-1}\|$$

where
  $p_i$=coordinates of point i
  n=number of points in the stroke
  $\lambda$=minimum length threshold (empirically set to 0.05)

Segmentation proceeds with the algorithm iterating through the samples until it has identified a potential segmentation point as defined by the current letter model. If the correct point cannot be found, the algorithm returns a failure, indicating that the input does not conform to the structure expected by the letter model. Otherwise, if the two sub-strokes created by splitting the stroke at this point will be larger than $l_{min}$, the stroke is split at that point and processing continues with the remainder of the stroke. If either sub-stroke is smaller than $l_{min}$, the segmentation point is ignored, and processing continues. When all segmentation points have been correctly identified, the procedure ends and indicates to the recognizer that segmentation was successful.

It is noted that letter models can use any arbitrary segmentation technique as indicated by the expected structure of the handwritten letter, and some models may not require any stroke segmentation. For example, simple models for 'c' and 'o' may simply match the input directly, without attempting to reduce the strokes to sub-stroke primitives. Generally, there is no information to be derived from the segmentation of these single ballistic gestures, and allowing matching against the un-segmented strokes can avoid the problems that can be generated by traditional segmentation techniques (e.g. the smooth velocity-curvature profile can cause segmentation to occur at an arbitrary point depending on the style of the writer).

The following examples illustrate the segmentation procedure for various models. FIG. 5 shows the critical points 30, 32 used for the segmentation of a single-stroke allograph of the letter 'a'.

Figures 2A, 2B:
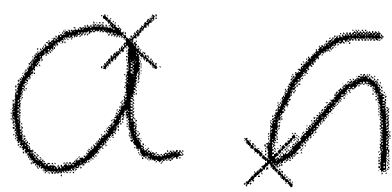
FIGS. 2a) and 2b) show well-formed and poorly-formed versions of the letter 'a'.
Figure 3:
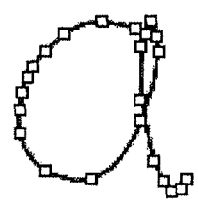
FIG. 3 shows how velocity segmentation may be used to interpret a letter 'a', and the problems associated therewith.

Assuming that the model expects the stroke to be segmented at the top of the letter stem 32, the segmentation algorithm initially searches for the first Y-minimum 30 then attempts to find a Y-maximum 32 after this point 30. If the Y-maximum is found, the point is marked as a segmentation point. Note that the Y-minimum 30 is not used for segmentation, but simply to ensure that the correct Y-maximum 32 point is found. Without first searching for an initial Y-minimum 30, an incorrect Y-maximum could be located (as show in FIG. 4*b*)). Also note that this procedure will find the correct segmentation point for all the examples discussed with regard to FIGS. 1-3 above.

As a counter-example, assume that a handwritten 'c', as input by the user, is being matched using the 'a' model defined above. While the Y-minimum will be found, the search for a subsequent Y-maximum will fail. End-points will not be matched as segmentation points. As a result, the segmentation procedure will fail, indicating that the input does not match the general structure of the model, allowing the model to be removed from the list of potential matches.

While the above segmentation procedure works well for a number of letter models, other models will require different algorithms. As a simple example, FIG. 6 shows the segmentation for a model of the letter 'b'.

To segment this single-stroke allograph of 'b', the first Y-minimum is found and used as the segmentation point 40, producing a vertical line sub-stroke, and a curved 'o' shaped sub-stroke. A more complex segmentation procedure is given in FIG. 7.

In the single-stroke model of the letter 'B' given above, the first segmentation point is found at the first Y-minimum 50. Following this, a Y-maximum 52 is found, followed by an X-minimum 54, which is used as the second segmentation point. FIG. 8 shows the segmented letter.

The result is an initial vertical line sub-stroke as shown in FIG. 8*a*), followed by a curved 'p' sub-stroke in FIG. 8*b*), and followed by a "sideways-u" sub-stroke in FIG. 8*c*). This segmentation approach is robust to variation in curvature and velocity, and produces consistent segmentation for a wide variety of writing styles. On the other hand, the global segmentation procedures used in the prior art can produce very inconsistent segmentation of handwritten letters such as the one given above, being dependent on degrees of curvature and consistent velocity of pen-strokes.

Not all letter models can be consistently segmented using X- and Y-extrema. For example, FIG. 9 shows the segmentation of a two-stroke allograph of the letter 'E'.

Using X-minima to detect segmentation points 60 and 62 may not be successful, especially if the letter is somewhat rotated or angled. Similarly, using Y-minima will not necessarily produce the correct segmentation. For this allograph, the two points of highest angular change in the first stroke can be used for segmentation. Note that an angular threshold is not required to find these points, since the two highest points of curvature can be easily found by sorting the curvature values at each point. More sophisticated processing is possible; for example, ensuring the segmentation points produce sub-strokes of roughly equal lengths. Overall, arbitrarily complex model-specific segmentation based on any structural feature of the input stroke can be performed to ensure the correct segmentation points are consistently found.

The segmentation procedure described above for the letter 'a' will work for all letter models that follow the basic structure of having a curved region followed by a cusp, followed by a down-stroke (e.g. some allographs of 'd', 'g', 'u', 'y', etc.) As a result, the sub-strokes found can be stored for later use when matching these similarly structured models. Further, if the sub-strokes are converted to a feature representation before classification, the feature vectors can be stored to prevent repeated feature extraction.

Many of the stroke segmentation techniques that can be used will require sub-stroke distance and curvature information. To avoid recalculating these values every time stroke segmentation is performed, a secondary data-structure can be created to cache the values by storing a distance and curvature value with each point on the stroke.

The following description illustrates how model-specific stroke segmentation can by used in the recognition of handwritten characters. While the example is based on a fuzzy-logic based classifier, it is apparent to the skilled person that this technique can be used with any classifier type that can utilize stroke segmentation, and the procedure can be easily incorporated into structural (such as elastic-matching) and statistical classifiers.

One approach to modeling the imprecision and stylistic variation of handwritten characters is to use fuzzy logic, which allows the definition of sets of criteria that are not precisely defined. Fuzzy logic classifiers work by assigning an input signal a degree of membership to a fuzzy model depending on how well the features match the fuzzy rules that describe the model. Suitable Fuzzy logic classifiers for handwritten character recognition are described further in: "A New Fuzzy Geometric Representation for On-Line Isolated Character Recognition", *International Conference on Pattern Recognition* (ICPR'98), pp. 1121-1123, 1998; and "Fuzzy Feature Description of Handwriting Patterns", *Pattern Recognition*, Vol. 30, No. 10, pp. 1591-1604, 1997.

As an example, a fuzzy logic rule for defining straight lines may contain the following sets: vertical lines (VL), horizontal lines (HL), lines of positive slant (PS), and lines negative slant (NS). Clearly, most lines will not fit perfectly within these restricted sets and will usually have a degree of membership to more than one of these sets. Thus, fuzzy logic defines a logical set notation where set membership is gradual rather than discrete. FIG. 10 illustrates a set of possible group membership functions for straight lines, as defined by normalized orientation (in degrees).

FIG. 10 shows a series of bell-like curves. As an example, the curve labeled VL, meaning Vertical Line, defined a set of lines which, when compared to a true horizontal line, have angles approximately in the range from a little below 45° to a little over 135°, with those closest to 90° having a higher weighting. Similar curves are shown for Horizontal Lines (HL), Negative Sloping Lines (NS) and Positive Slanting Lines (PS).

The example fuzzy logic classifier consists of a set of rules that define individual letter models. These rules match stroke and sub-stroke primitives against a set of generic stroke shapes. The rules also include relative position information used to distinguish letters that are composed of similar primitives. The linguistic primitives used include an 'o'-like curve (OC) shown in FIG. 11a, a 'c'-like curve (CC) shown in FIG. 11b, a 'd'-like curve (DC) shown in FIG. 11c, and a vertical curve to the right (RVC) shown in FIG. 11d.

For each sub-stroke, a degree of membership in these primitive sets is calculated based on a simple structural analysis of the strokes using the following information: the absolute stroke curvature, the position of the start and end points in relation to the bounding box of the stroke, and the orientation of the line between the start and end points.

The positional primitives LEFT, RIGHT, TOP, CENTRE, and BOTTOM indicate stroke position within the bounding box of the letter, and the straight-line primitives described above (VL, HL, PS, NS) are also used. Some typical rule examples are:

RULE 'a': (OC | CC) & LEFT & CENTRE, (VL | RVC) & RIGHT

RULE 'b': VL & LEFT, (OC | DC) & RIGHT & BOTTOM

RULE 'c': CC

RULE 'd': (OC | CC) & LEFT & BOTTOM, VL & RIGHT

⋮

⋮

⋮

In the rules above, the '|' symbol indicates a fuzzy OR, the '&' symbol indicates a fuzzy AND, parenthesis indicate logical precedence, and a comma indicates sub-stroke composition using a fuzzy AND (i.e. the expression on the left of the comma is evaluated using the first sub-stroke, the expression on the right is evaluated using the second sub-stroke, with the results combined using a fuzzy AND).

As an example, the first rule can be read as follows: an 'a' letter is an 'o'-like curve or a 'c'-like curve located to the left and centered vertically in the letter, followed by a vertical line or a vertical curve to the right, located at the right of the letter. It is noted that there may be many alternate rules for each letter, modeling the stylistic variability of handwriting.

While these rules describe how the primitives are composed for each letter model, they do not indicate how strokes are decomposed into the primitives. To do this, each rule is associated with a model-specific segmentation rule that is executed against the input strokes before the rule is evaluated:

RULE 'a': $MIN_Y \rightarrow MAX_Y$

RULE 'b': $MIN_Y$

RULE 'c':

RULE 'd': $MAX_Y \rightarrow MIN_Y$

⋮

⋮

⋮

RULE 'k': $MIN_Y, MAX_Y, MIN_X$

⋮

⋮

⋮

$MAX_Y$ represents a search for the next Y-maximum. $MIN_Y$ represents the search for the next Y-minimum. The → symbol indicates that the point defined on the left is found first but not used for segmentation; rather it is found to ensure the subsequent point is correctly located. Note that the classification of the 'c' model requires only a single stroke, and thus no segmentation is performed for that model. The 'k' model is shown as an example of a rule containing multiple segmentation points, found in the order specified.

Once the stroke segmentation is performed using the model-specific rules, the sub-strokes are classified by degree of membership in the generic stroke classes. These membership values are then used to evaluate the structure rules, giving an indication of how well the input matches the letter model. Each letter model is similarly evaluated, and the input is classified as the class of the model that gives the highest fuzzy membership value.

In summary, each input is tested against each rule, and each rule further defines the segmentation approach to be taken in the expectation that the input character is the same as the character being tested for. If the segmentation for a particular character model cannot be performed because the input character does not conform to the character being tested for by the rule, then a zero or low score will be attached to that attempt at classification.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made herein by one of ordinary skill in the art without departing from the scope of the present invention as hereinbefore described and as hereinafter claimed.

The invention claimed is:

1. A method for classifying a handwritten input character, the method comprising the steps of, performed by a processor:
   (a) receiving the handwritten input character from an input device;
   (b) for each of a plurality of character models, each character model being associated with an output character and defining a model specific segmentation scheme for that output character and an associated segment model, the model specific segmentation scheme defining a minimum length corresponding to a number of points in a stroke of the output character:
   (bi) decomposing the handwritten input character into one or more segments in accordance with the model specific segmentation scheme of the respective character model; and
   (bii) evaluating the one or more segments against the segment model of the respective character model to produce a score indicative of the conformity of the one or more segments with the segment model;
   (c) selecting the character model that produced the highest score; and,
   (d) classifying the handwritten input character as the output character associated with the character model that produces the highest score.

2. The method of claim 1, wherein each character model has a plurality of associated model specific segmentation schemes.

3. The method of claim 2, wherein the method includes for each character model, determining whether the input character is capable of being segmented with one of the segmentation schemes, and if the input character is incapable of be segmented, changing the segmentation scheme.

4. The method of claim 1, wherein the method includes classifying the input character as any one of a letter, a number, or a punctuation mark.

5. The method of claim 1, wherein the model specific segmentation scheme further defines a minimum length threshold of segments.

6. The method of claim 1, wherein the method includes defining different rules for decomposing the handwritten input character into one or more segments for different character models.

7. The method of claim 1, wherein fuzzy logic rules are used in evaluating the one or more segments against the segment model of the respective character model.

* * * * *